Patented Apr. 18, 1933

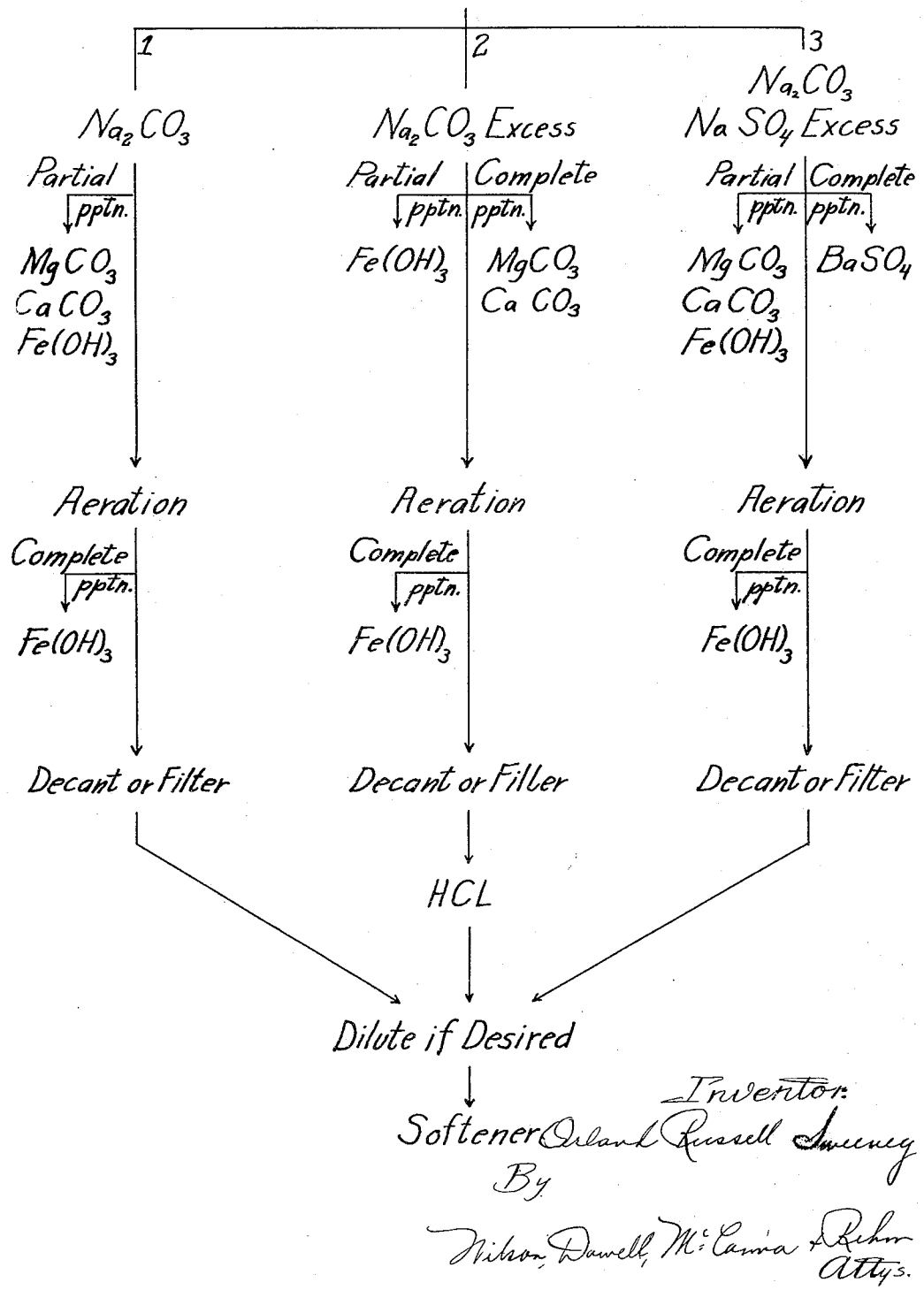

1,903,949

UNITED STATES PATENT OFFICE

ORLAND RUSSELL SWEENEY, OF AMES, IOWA, ASSIGNOR, BY MESNE ASSIGNMENTS, TO THE PERMUTIT COMPANY, OF WILMINGTON, DELAWARE, A CORPORATION OF DELAWARE

PROCESS OF REGENERATING BASE-EXCHANGE SUBSTANCES

Application filed December 20, 1929. Serial No. 415,425.

This invention relates to water softening and has special reference to a process whereby natural salt or brine may be employed for the purpose of regenerating base-exchange substances employed for water softening.

As is well known the base-exchange method of softening water operates in two cycles. First, the hard water is passed through a bed of the mineral after which the flow of water is stopped and second, a salt brine is passed through the mineral bed to remove the hardness therefrom. The salt used in the regeneration of base-exchange softeners is of great importance and the cost of this material frequently decides whether the zeolitic process is economically to be preferred over others. It is well known that certain regions in the United States have large underlying beds of salt rock or great pools of salt brine.
These regions cover a very large area and many of them are located in centers of dense population. It is common practice at the present time to either mine the salt or pump the salt brine to the surface and evaporate it to dryness. In regions where the salt does not occur as a brine it is common practice to pump water into the salt bed, allow it to become saturated with salt and again pump it to the surface. The resulting product is a brine of high salt concentration. After suitable processing the salt is marketed. In some cases the salt as obtained before processing is pure enough to use directly in a base-exchange water softener for regenerative purposes. In most cases, however, the salt or brine contains so much calcium, magnesium, iron, and in some cases barium, as to render it unsatisfactory for the purpose. Since the purpose of regeneration is to remove the calcium and magnesium, obviously the regenerating solution should contain little or no calcium and magnesium. Barium has a toxic effect upon the human system and should, therefore, be removed from the regenerating solution before it may be employed. While barium might not be held in the bed, there is a chance that through careless washing the water system might become contaminated and the user poisoned. I have found that either the naturally occurring brine or the brine formed from naturally occurring salt in the mining operation may be satisfactorily treated to produce a regenerating brine solution by a relatively simple means.

One of the principal objects of my invention is the provision of an improved method for obtaining salt brine for regeneration of base exchange water softeners.

I have further aimed to provide a process for treating natural salt brine, whereby regenerating solutions may be obtained at small cost.

Another object is the provision of a process for partially refining natural salt brines for water softening purposes.

Other objects and advantages will become apparent to those skilled in the art from the following description and the accompanying drawing.

The figure is a diagram showing in diagrammatic form the various steps to be employed in my process.

In practicing my invention, I may take the brine as obtained in either of the above methods and add thereto a quantity of sodium carbonate or soda ash sufficient to precipitate substantially all of the calcium and magnesium in the form of calcium and magnesium carbonate. I have found that by adding sufficient soda ash to bring the hydrogen ion concentration of the brine to a point satisfactory for regenerating purposes I will precipitate both the calcium and the magnesium. While a small proportion of these two elements will still remain in the salt solution the amount thereof is not sufficient to materially affect the efficiency of the regenerating solution. However, if I desire to remove all or substantially all of these elements I may add an excess of soda ash over and above that required for theoretically combining with the calcium and magnesium. By so doing I render the brine too highly alkaline for proper use as a regenerating solution, but this may be remedied by a later step in the process.

In order to remove the dissolved iron it may be desirable to aerate the brine. This may be accomplished in any one of a number of ways. I have found it satisfactory to blow air under pressure through a tube of filtrose positioned in the bottom of the container, whereby a large number of small bubbles are introduced. The iron salts, which may be present, are thereby oxidized and precipitated as the hydroxide. After the addition of the soda ash and the aeration of the brine, it is necessary to remove the precipitated solids. This may be accomplished in any suitable manner. For example, the brine may be permitted to stand until the precipitate has settled to the bottom of the container. The supernatant brine may then be drawn off. Obviously, the brine may be filtered, centrifuged or treated in any of the well known methods. The clear brine resulting from the clarified steps may then be diluted if necessary to a concentration proper for regeneration purposes, when it is ready to be employed in the softener. Where an excess of soda ash has been used, the alkalinity is increased and I have found it advisable to add a certain amount of hydrochloric acid, sufficient to bring the hydrogen ion concentration of the brine to a point suitable for regeneration purposes. While the most desirable hydrogen ion concentration varies with the individual mineral, generally speaking, the most satisfactory point lies in the region of 6.5 on the pH scale. There is, of course, a slight permissible variation on either side of this figure. In practicing my invention, however, I prefer to employ this method and add a slight excess of soda ash as outlined in the latter method. Then, after filtering or settling, I add sufficient hydrochloric acid to adjust the pH of the brine to the mineral under consideration.

In the event that the brine contains barium, barium carbonate being somewhat more soluble than calcium and magnesium carbonate, it is preferable that such a quantity of sodium sulphate be added as to remove the barium from solution. The presence of sulphates in brine will cause substantially complete precipitation of the barium from solution as insoluble barium sulphate. The sodium sulphate may be added to the brine in excess if desired since I have found that the presence of sodium sulphate in the brine has no harmful effect upon the base exchange substances, and does not interfere with the regeneration process.

The figure shows in diagrammatic form the principal steps to be performed in operating my process. Procedure number 1 is a procedure which may be employed on simple brines, wherein barium is absent. Procedure number 2 is a more refined procedure adapted to give better results than number 1, but being in essence the same process. Procedure number 3 is a modification of procedure number 1 adapted to be used where the brine contains barium. It will be seen that various combinations of these procedures may be used depending upon the results desired, and upon the brine. It should be understood that throughout the specification and claims the term natural brines is intended to mean either naturally occurring salt brines or brines prepared by pumping water through naturally occurring salt beds.

In practicing my invention in its preferred form I take a quantity of natural brine and add thereto a quantity of soda ash in amount greater than that required to react chemically with the calcium and magnesium of the brine to form calcium and magnesium carbonate. If barium is present in the brine I also add a quantity of sodium sulphate in an amount greater than that required to react with the barium to form barium sulphate. I then agitate this mixture by means of free air introduced at the bottom of the container preferable through a filtrose or similar tube. This agitation is continued until the iron is substantially removed from solution. I then remove the precipitated solids from the brine by filtration, decantation or other suitable means. The clear brine is then treated with hydrochloric acid to produce a brine having a suitable hydrogen ion concentration. The brine is then diluted to a salt concentration suitable for regeneration purposes after which it is passed through the bed of base-exchange material to regenerate the same. When barium is not found in the natural brine the procedure is identical except that the sodium sulphate is not employed.

The addition of the hydrochloric acid after the chemical precipitation of calcium and magnesium, has not only the purpose of adjusting the pH value of the brine but also arrests and prevents the further precipitation of calcium or magnesium, avoiding the depositing of calcium or magnesium on the zeolites. This is because on the addition of the hydrochloric acid the soda ash is converted into sodium chloride and there is no longer any negative ion present to precipitate out any calcium and magnesium.

Obviously, my process will be of the greatest benefit in those regions having underlying salt deposits. An examination of the mineral map of North America shows, however, that there is a very large area having such underlying deposits. In these regions a well may be sunk into a pool of brine which is known to be in the earth at the given point, or a well is sunk into a bed of salt, and water is introduced and allowed to become saturated, the operation of the well being in accordance with the well known practice in the salt industry. The brine may then be pumped up and treated in accordance with the process already outlined. In this manner it becomes possible to obtain the salt for water softening at a cost little above the price of pumping water, the cost of the chemical treatment being very small.

While I have set forth sodium carbonate or soda ash as being the precipitant for calcium and magnesium it will be plain that there are other reagents, well known to chemists, which are capable of forming insoluble compounds with calcium and magnesium, such as the carbonates of the other alkali metals, the phosphates of the alkali metals, sodium hydroxide and the like. Soda ash is, however, preferable because of its low cost.

The step of the process in which the hydrogen ion concentration of the brine is adjusted may be made before or after dilution, if dilution is to be carried out. However, if such adjustment is to be made before dilution, care must be taken to add sufficient acid to result in a suitable hydrogen ion concentration of the diluted brine.

By my process the cost of evaporating the water from brine solutions is entirely eliminated. In like manner the cost of a variety of processing operations usually given to salt which is to be marketed are eliminated, and the cost is thus reduced.

While I have thus described and illustrated a specific embodiment of my invention, I am aware that numerous alterations and changes may be made therein without materially departing from the spirit of the invention, and I do not wish to be limited except as required by the prior art and the scope of the appended claims.

I claim:

1. The improvement in the method for regenerating base-exchange material of a water softening system, whereby to cheapen the cost of operation of such system, which consists in supplying natural salt brine for use as regenerating liquid, conditioning said liquid for said use by treatment which includes causing a chemical precipitation of calcium and magnesium present in the natural salt brine and separating the precipitate and then adding an agent whereby to prevent further precipitation of calcium and magnesium and to produce a desired hydrogen ion concentration, and passing the treated liquid through the base-exchange material.

2. The improvement in the method of regenerating base-exchange material of a water softening system, whereby to cheapen the cost of operation of such system, which consists in supplying natural salt brine for use as regenerating liquid, conditioning said liquid for said use by treatment including removal of calcium and magnesium from the brine by chemical precipitation and separation of the precipitate, also including the addition after such precipitation and separation of an agent to combine with an element of said first mentioned reagent to prevent continued precipitation of calcium and magnesium, and passing the treated liquid through the base-exchange material.

3. The process of preparing regenerating liquid for regeneration of base-exchange substances which includes treating natural salt brine to cause precipitation of calcium and magnesium, by action of a reagent in a greater quantity than required to combine chemically with the calcium and magnesium present in the brine, separating the precipitate from the brine, and thereafter adding an agent to combine with an element of said first mentioned reagent to prevent further precipitation of calcium and magnesium.

4. The process of preparing regenerating liquid for regeneration of base-exchange substances which includes treating natural salt brine with the carbonate of an alkali metal, in quantity greater than that required to chemically combine with the calcium and magnesium present, to precipitate the calcium and magnesium, separating the insoluble substances thus formed from the brine, and adding sufficient acid to the brine to bring the hydrogen ion concentration thereof to a desired value.

5. The process of preparing regenerating liquid for regeneration of base-exchange substances which includes treating natural salt brine with the carbonate of an alkali metal, in quantity greater than that required to chemically combine with the calcium and magnesium present, to precipitate the calcium and magnesium, adding the sulphate of an alkali metal in quantity greater than required to chemically combine with the barium present, to precipitate the latter, separating the insoluble substances thus formed, and adding sufficient acid to the brine to bring the hydrogen ion concentration thereof to a desired value.

6. The process of preparing regenerating liquid for regeneration of base-exchange substances which includes treating natural salt brine with the carbonate of an alkali metal, in quantity greater than that required to chemically combine with the calcium and magnesium present, to precipitate the calcium and magnesium, adding the sulphate of an alkali metal, in quantity greater than required to chemically combine with the barium present, to precipitate the latter, aerating the brine to precipitate the iron therefrom, separating the insoluble substances thus formed in the brine, and adding sufficient acid to the brine to bring the hydrogen ion concentration thereof to a desired value.

7. The process of preparing regenerating liquid for regeneration of base-exchange substances which includes treating natural salt brine with the carbonate of an alkali metal, in quantity greater than that required to chemically combine with the calcium and magnesium present, to precipitate the calcium and magnesium, separating the insoluble substance thus formed from the brine, and then adding hydrochloric acid to the brine.

8. The method for economical regeneration of base-exchange material of a water-softening system which comprises supplying regenerating solution by treatment of natural salt brine to remove harmful constituents, including removal of calcium and magnesium by chemical precipitation and separation of the precipitate, while always retaining the sodium chloride of the brine in a state of solution, and passing the treated solution through said material; the brine being withdrawn from an earth source and conditioned for use as regenerating solution by such treatment and passed through said material as successive connected operations.

In witness of the foregoing I affix my signature.

ORLAND RUSSELL SWEENEY.